(12) United States Patent
Gotoh

(10) Patent No.: US 8,779,748 B2
(45) Date of Patent: Jul. 15, 2014

(54) ERROR AMPLIFICATION CIRCUIT, CONTROL METHOD FOR ERROR AMPLIFICATION CIRCUIT, AND SWITCHING REGULATOR EMPLOYING ERROR AMPLIFICATION CIRCUIT

(75) Inventor: Takashi Gotoh, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 259 days.

(21) Appl. No.: 13/349,084

(22) Filed: Jan. 12, 2012

(65) Prior Publication Data
US 2012/0187995 A1    Jul. 26, 2012

(30) Foreign Application Priority Data
Jan. 25, 2011   (JP) .................................. 2011-013149

(51) Int. Cl.
*G05F 1/00* (2006.01)
*G01R 19/00* (2006.01)
*H03K 5/22* (2006.01)

(52) U.S. Cl.
USPC ............. 323/288; 323/242; 323/274; 327/51; 327/72

(58) Field of Classification Search
USPC ................. 323/242, 243, 268, 274–276, 279, 323/284–288; 327/5, 7, 10, 51, 52, 54, 56, 327/72, 73, 77–79, 87, 89; 361/79, 85–87
See application file for complete search history.

(56) References Cited

U.S. PATENT DOCUMENTS

| | | | |
|---|---|---|---|
| 2008/0284396 A1* | 11/2008 | Hata et al. ...................... | 323/282 |
| 2009/0102444 A1* | 4/2009 | Nonaka .......................... | 323/282 |
| 2009/0167407 A1* | 7/2009 | Okuyama ....................... | 327/337 |
| 2009/0278521 A1* | 11/2009 | Omi et al. ...................... | 323/288 |

FOREIGN PATENT DOCUMENTS

JP    59-91517    5/1984

* cited by examiner

*Primary Examiner* — Adolf Berhane
*Assistant Examiner* — Gary Nash
(74) *Attorney, Agent, or Firm* — Cooper & Dunham LLP

(57) ABSTRACT

An error amplification circuit includes an integrated circuit and a phase compensation capacitor. The integrated circuit includes an error amplifier to amplify a difference between a predetermined reference voltage and an input feedback voltage for output; a current generator circuit to generate a bias current for supply to the error amplifier; a phase compensation resistor; a bias-current control terminal; and a phase compensation terminal connected to an output terminal of the error amplifier via the phase compensation resistor. The phase compensation capacitor is connected to the phase compensation terminal, the phase compensation capacitor being provided outside the integrated circuit.

7 Claims, 7 Drawing Sheets

ERROR AMPLIFICATION CIRCUIT, CONTROL METHOD FOR ERROR AMPLIFICATION CIRCUIT, AND SWITCHING REGULATOR EMPLOYING ERROR AMPLIFICATION CIRCUIT

CROSS-REFERENCE TO RELATED APPLICATIONS

This patent application is based on and claims priority pursuant to 35 U.S.C. §119 to Japanese Patent Application No. 2011-013149, filed on Jan. 25, 2011 in the Japan Patent Office, the entire disclosure of which is hereby incorporated by reference herein.

BACKGROUND

1. Technical Field

The present disclosure relates to an error amplification circuit to perform phase compensation, a control method for the error amplification circuit, and a switching regulator employing the error amplification circuit.

2. Description of the Background Art

In known exterior phase compensation methods for error amplifiers used in power supplies such as switching regulators and series regulators, typically a phase compensation circuit in which a phase compensation resistor and a phase compensation capacitor are connected in series is connected between a phase compensation terminal of an integrated circuit and a ground terminal However, the phase compensation terminal has parasitic capacitance (capacitor) and is connected to an error-voltage output terminal of an error amplifier. Therefore, the parasitic capacitance of the phase compensation terminal and an external phase compensation circuit are connected in parallel to the error-voltage output terminal of the error amplifier. A technique is known in which, by reducing impedance of the external phase compensation circuit compared to the parasitic capacitance of the phase compensation terminal, the output resistance of the error amplifier is reduced to a level suitable for the external phase compensation circuit.

FIG. 1 is a circuit diagram illustrating a configuration of a conventional error amplification 110a installed in a switching regulator 100. The error amplification circuit 110a includes an integrated circuit 110 and a phase compensation circuit COMP101. In addition, the integrated circuit 110 includes an error amplifier EA101, a current source Ir101, a reference voltage source V101, and a phase compensation terminal T102. A parasitic capacitor Cp101 is generated at the phase compensation terminal T102. The phase compensation circuit COMP101 includes a phase compensation resistor Rc101 and a phase compensation capacitor Cc101.

As shown in FIG. 1, the phase compensation resistor Rc101 and the phase compensation capacitor Cc101 are connected in series between the phase compensation terminal T102 and the ground terminal. In addition, a reference voltage Vref1 generated in the reference voltage source V101 is applied to a non-inverting input terminal (+) of the error amplifier EA101, and an input voltage (feedback voltage) Vfb101 is applied to an inverting input terminal (−) of the error amplifier EA101. An output terminal (error-voltage output terminal) T111 of the error amplifier EA101 is connected to the phase compensation terminal T102.

In the error amplification circuit 110a shown in FIG. 1, the current source Ir101 generates a predetermined bias current Ibias101 for supply to the error amplifier EA101. The error amplifier EA101 amplifies a difference between the reference voltage Vref1 and the input voltage Vfb101 for output as an error voltage Ve101 to a next stage of the circuit via the output terminal T111 thereof. In addition, the phase compensation circuit COMP101 compensates for phase in the error amplifier EA101.

Since the error amplification circuit 110a shown in FIG. 1 includes the external phase compensation resistor Rc101 in the phase compensation circuit COMP101 that is provided outside the integrated circuit 110, by changing the resistance of the phase compensation resistor Rc101a gain in a high-frequency range of the error voltage Ve101 output from the error amplifier EA101 can be controlled externally. Therefore, it is not necessary to control the bias current Ibias so as to control the high-frequency gain of the error voltage Ve101. By contrast, since the parasitic capacitor Cp101 generated in the error amplifier EA101 is connected to the output terminal T111 of the error amplifier EA101, the error amplifier EA101 is directly affected by the parasitic capacitor Cp101, making it necessary to design the error amplifier EA101 in accordance with the configuration of the error amplification circuit 110a.

As described above, in order to suit the external phase compensation method, the impedance of the external phase compensation circuit COMP101 is set smaller than the parasitic capacitor Cp101 of the phase compensation terminal T102, and the output resistance of the error amplifier EA101 is set sufficiently small to suit the external phase compensation circuit COMP101, which enormously increases both the size of the circuit and the consumption of current in the circuit compared to an error amplification circuit with a built-in phase compensation circuit.

BRIEF SUMMARY

The present patent specification describes an improved error amplification circuit in which a phase compensation capacitor can be provided outside an integrated circuit to control an error voltage without increasing the size of the integrated circuit and consumption of current in the integrated circuit, a control method for the error amplification circuit, and a switching regulator employing the error amplification circuit.

In one aspect of this disclosure, there is a provided an error amplification circuit including an integrated circuit and a phase compensation capacitor. The integrated circuit includes an error amplifier, a current generator circuit, a phase compensation resistor, a bias-current control terminal, and a phase compensation terminal. The error amplifier, having an output terminal, amplifies a difference between a predetermined reference voltage and an input feedback voltage for output. The current generator circuit generates a bias current for supply to the error amplifier. The phase compensation resistor is connected to the output terminal of the error amplifier. The bias-current control terminal is connected to the current generator circuit. The phase compensation terminal is connected to the output terminal of the error amplifier via the phase compensation resistor. The phase compensation capacitor that is connected to the phase compensation terminal, and the phase compensation capacitor is provided outside the integrated circuit.

In another aspect of this disclosure, there is a provided a control method for controlling an error amplification circuit that includes an integrated circuit and a phase compensation capacitor. The control method includes generating a bias current in a current generator circuit in the integrated circuit; controlling the bias current from outside the integrated circuit; generating a predetermined reference voltage in the integrated circuit; inputting a feedback voltage, the predetermined reference voltage, and the bias current to an error amplifier in the integrated circuit; amplifying a difference between the predetermined reference voltage and the feedback voltage for output as an error voltage in the error amplifier in the integrated circuit; applying the error voltage to a phase compensation resistor; and compensating for phase in the error amplifier in the integrated circuit by the phase compensation resistor in the integrated circuit and the phase compensation capacitor provided outside the integrated circuit.

In another aspect of this disclosure, there is a provided a switching regulator employing a reference voltage generation circuit to generate a predetermined reference voltage; a feedback circuit to feedback a voltage for output as a feedback voltage; and the above-described error amplification circuit to amplify a difference between the predetermined reference voltage and the feedback voltage for output.

BRIEF DESCRIPTION OF THE DRAWINGS

The aforementioned and other aspects, features and advantages are better understood by reference to the following detailed description when considered in connection with the accompanying drawings, wherein.

DETAILED DESCRIPTION OF PREFERRED EMBODIMENTS

Figure 1:
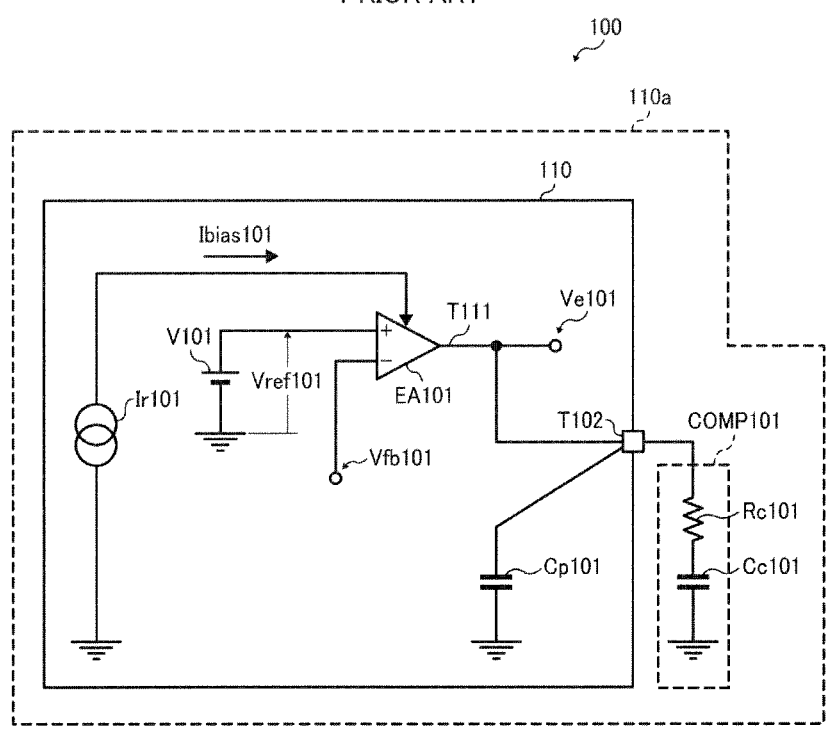
FIG. 1 is a block diagram illustrating a configuration of a conventional error amplification circuit.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views, particularly to FIGS. 2 and 3, an error amplification circuit according to an illustrative embodiment is described.

Figure 2:
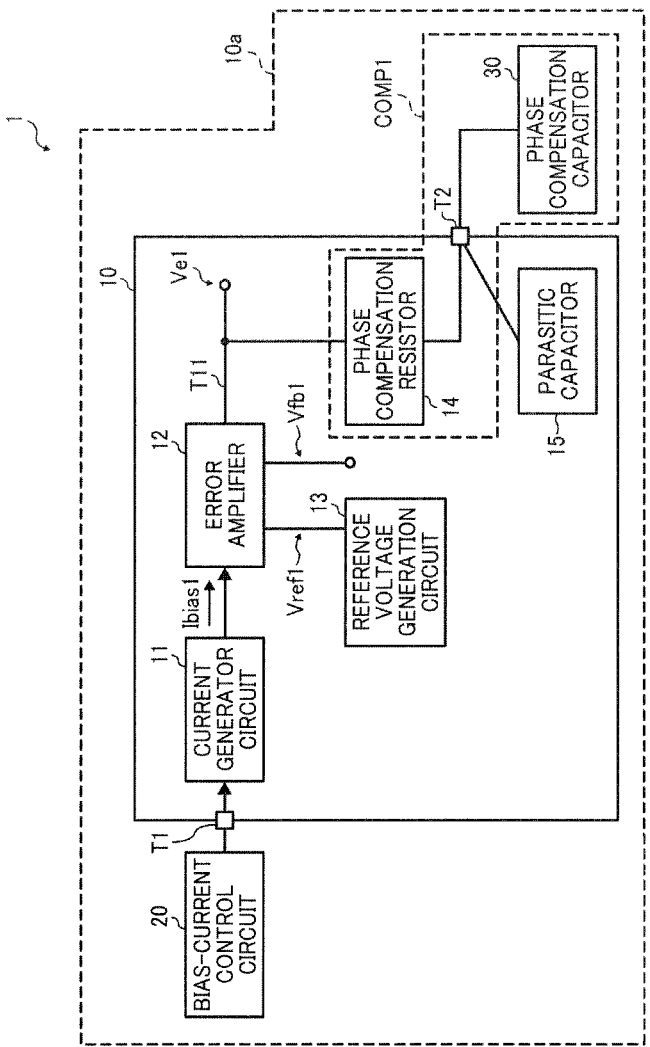
FIG. 2 is a block diagram illustrating a configuration of an error amplification circuit according to the present embodiment of this disclosure.
Figure 9:
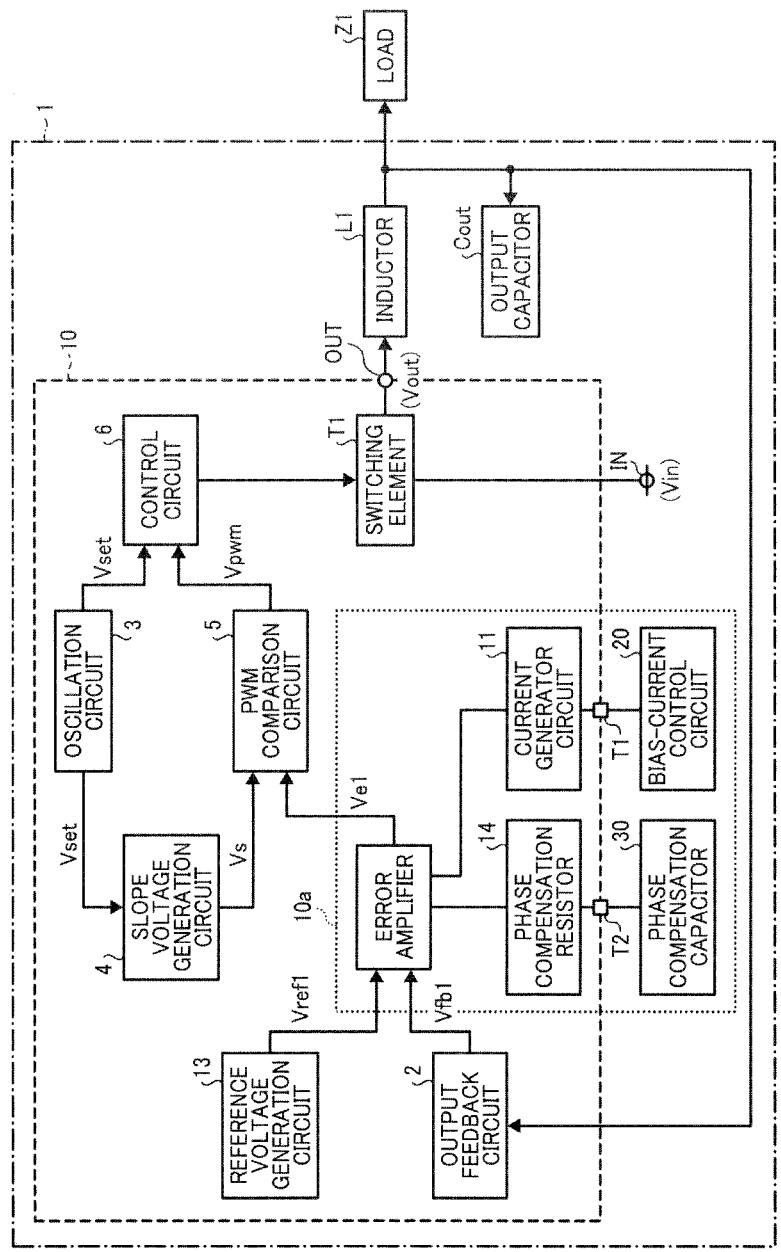
FIG. 9 is a block diagram illustrating a switching regulator including the error amplification circuit shown in FIG. 2

FIG. 2 is a block diagram illustrating a configuration of an error amplification circuit 10a in a switching regulator 1. The error amplification circuit 10a includes an integrated circuit 10, a bias-current control circuit 20, and a phase compensation capacitor 30. The integrated circuit 10 includes a current generator circuit 11, an error amplifier 12, a reference voltage generation circuit 13, a phase compensation resistor 14, a bias-current control terminal T1, and a phase compensation terminal T2. The phase compensation terminal T2 generates a parasitic capacitor 15. The phase compensation resistor 14, the phase compensation terminal T2, and the phase compensation capacitor 30 constitute a phase compensation circuit COMP1. It is to be noted, although the reference voltage generation circuit 13 is provided inside the error amplification circuit 10a shown in FIG. 1, the reference voltage generation circuit 13 may be independent of the error amplification circuit 10a as shown in FIG. 9.

More specifically, in the integrated circuit 10 of the error amplification circuit 10a, the error amplifier 12 amplifies a difference between a predetermined reference voltage Vref1 for output and an input voltage (feedback voltage) Vfb1, and the current generator circuit 11 supplies a bias current Ibias to the error amplifier 12. In the integrated circuit 10, the bias-current control terminal T1 is connected to the current generator circuit 11, and the phase compensation terminal T2 is connected to an output terminal of the error amplifier 12. The error amplification circuit 10a includes the phase compensation capacitor 30 that is connected to the phase compensation terminal T2 and is provided outside the integrated circuit 10.

In FIG. 2, the bias-current control circuit 20 is connected to the current generator circuit 11 via the bias-current control terminal T1. Herein, the bias-current control circuit 20 may be formed by a bias-current control resistor Ri1 (see FIG. 3). In this case, the current generator circuit 11 generates the bias current Ibias based on a resistance of the bias-current control circuit 20 constituted by the bias-current control resistor Ri1 and supplies the bias current Ibias to the error amplifier 12.

Alternatively, the bias-current control circuit 20 may generate a bias-current control voltage. In this case, the current generator circuit 11 generates the bias current Ibias based on a voltage value of the bias-current control voltage applied from the bias-current control circuit 20 and supplies the bias current Ibias to the error amplifier 12.

The error amplifier 12 receives the predetermined reference voltage Vref1 from the reference voltage generation circuit 13 and the input feedback voltage Vfb1 and amplifies the difference between the reference voltage Vref1 and the input voltage Vfb1 for out it as an error voltage Ve1 to a next stage of the circuit via an output terminal T11 thereof. The phase compensation resistor 14 is connected between the output terminal T11 of the error amplifier 12 and the phase compensation terminal T2, and the phase compensation terminal T2 is connected to the external phase compensation capacitor 30. The phase compensation resistor 14 and the phase compensation capacitor 30 constituting the phase compensation circuit COMP1 compensates for phase in the error amplifier 12.

Thus, in FIG. 2, since the error amplification circuit 10a includes the bias-current control circuit 20 that is provided outside the integrated circuit 10, the bias current Ibias to be supplied to the error amplifier 12 by the current generator circuit 11 can be controlled externally. Therefore, although the error amplification circuit 10a shown in FIG. 2 includes the phase compensation resistor 14 provided inside the integrated circuit 10, a gain in a high-frequency range (hereinafter just "high-frequency gain") of the error voltage Ve1 output from the error amplifier 12 can be controlled from outside the integrated circuit 10.

In addition, in the error amplification circuit 10a shown in FIG. 2, because the parasitic capacitor 15 is connected in parallel to the phase compensation capacitor 30, when a capacitance of the phase compensation capacitor 30 is set to a value obtained by subtracting a capacitance of the parasitic capacitor 15 from a setting value of the phase compensation capacitor 30, the switching regulator 1 executes a desired operation. The phase compensation capacitor 30 does not directly depend on performance of the error amplifier 12, and therefore it is not necessary to design the error amplifier 12 in accordance with the configuration of the error amplification circuit 10a.

Figure 3:
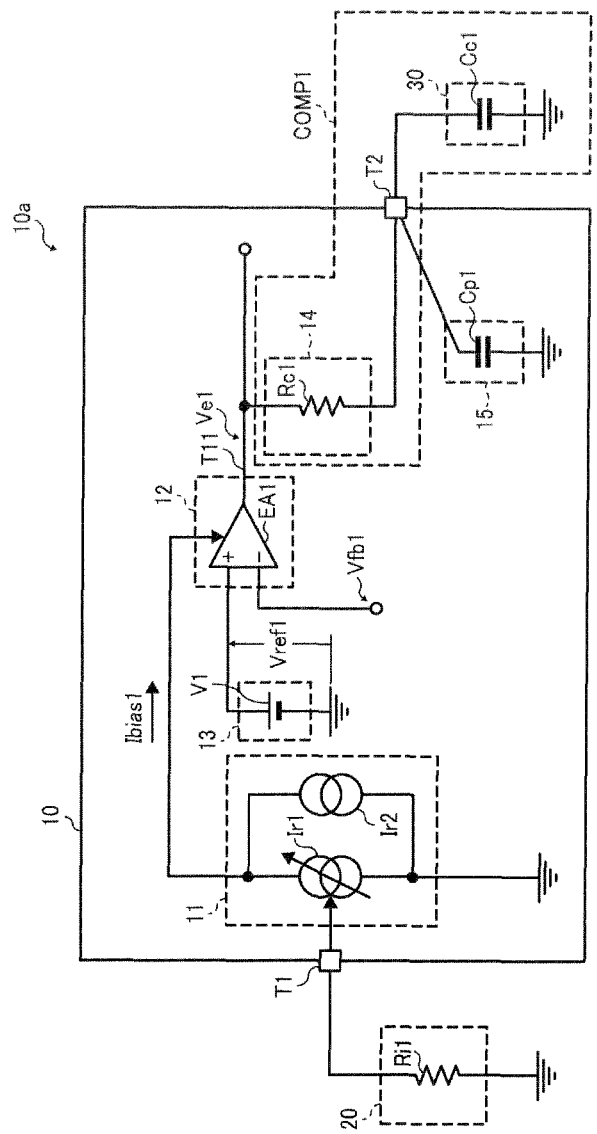
FIG. 3 is a circuit diagram illustrating a configuration of the error amplification circuit shown in FIG. 2.

FIG. 3 is a circuit diagram illustrating a configuration of the error amplification circuit 10a. It is to be noted that, components of the of the error amplification circuit 10a in FIG. 3 functioning similar to the error amplification circuit 1 in FIG. 2 are represented by identical numerals in FIG. 2.

With reference to FIG. 3, the current generator circuit 11 includes a variable current source Ir1 and a current source Ir2, the error amplifier 12 includes an error amplifier EA1, the reference voltage generation circuit 13 includes a voltage source V1 to generate the reference voltage Vref1, and the phase compensation resistor 14 includes a phase compensation resistor Rc1 whose resistance is rc1. In FIG. 3, the parasitic capacitor 15 is represented by a capacitor Cp1 whose capacitance is cp1.

A current control terminal of the variable current source Ir1 is connected to the bias-current control terminal T1. The variable current source Ir1 and the current source Ir2 are connected in parallel between the error amplifier EA1 and the ground terminal. A non-inverting input terminal (+) of the error amplifier EA1 is connected to the voltage source V1, and the input feedback voltage Vfb1 is applied to an inverting input terminal (−) of the error amplifier EA1. The output terminal T11 of the error amplifier EA1 is connected to one end of the phase compensation resistor Rc1 (14). The other end of the phase compensation resistor Rc1 (14) is connected to the phase compensation terminal T2.

With reference to FIG. 3, the bias-current control circuit 20 is constituted by a bias-current control resistor Ri1 whose resistance is ri1, and the bias-current control resistor Ri1 is connected between the bias-current control terminal T1 and the ground terminal. The phase compensation capacitor 30 is constituted by a phase compensation capacitor Cc1 whose capacitance is cc1, which is connected between the phase compensation terminal T2 and the ground terminal.

In FIG. 3, the variable current source Ir1 generates the current ir1 in accordance with the resistance ri1 of the bias-current control resistor Ri1 constituting the bias-current control circuit 20 connected to the bias-current control terminal T1. For example, as the resistance ri1 is greater, the current ir1 generated in the variable current source Ir1 is decreased. When the bias-current control terminal T1 is opened, the current source Ir1 does not generate the current. By contrast, at this time, the current source Ir2 always generates the current ir2. That is, the current generator circuit 11 generates a first non-zero bias current when the bias-current control terminal T1 is opened, and the current generator circuit generates a second bias current differing from the first bias current when the bias-current control terminal T1 is connected to the bias-current control resistor Ri1.

Accordingly, the current generator circuit 11 combines the current ir1 generated in the variable current source Ir1 and the current ir2 generated in the current source Ir2 and supplies the combined current to the error amplifier EA1 as the bias current Ibias1. The bias current Ibias1 is controlled by the bias-current control resistor Ri1 such that the bias current Ibias1 is equal to or greater than the bias current Ibias2. Herein, when the bias-current control resistor Ri1 controls the bias current Ibias such that the bias current Ibias1 is equal to the bias current Ibias2, the bias-current control terminal T1 may be opened, thus reducing the number of components in the error amplification circuit 10a.

Although the current generator circuit 11 controls the bias current Ibias1 in accordance with the bias-current control resistor Ri1 connected to the bias-current control terminal T1, the operation of the present disclosure is not limited above.

In an alternative configuration, the current generator circuit 11 may control the bias current Ibias1 in accordance with the bias-current control voltage generated in the bias-current control circuit 20 applied to the bias-current control terminal T1. In the present configuration, the current generator circuit 11 generates a first non-zero bias current when the bias-current control terminal T1 is opened, and the current generator circuit 11 generates a third bias current differing from the first bias current when a bias-current control voltage generated in the bias-current control circuit 20 is applied to the bias-current control terminal T1.

In another variation, although the current generator circuit 11 controls the bias current Ibias such that the bias current Ibias1 is equal to or greater than the current Iir2 in FIG. 3, the current generator circuit 11 may control the bias current Ibias1 in accordance with the above described bias-current control resistor Ri1 or the above-described bias-current control voltage such that the bias current Ibias1 is set to be smaller than the bias current Ibias2.

Figure 4:
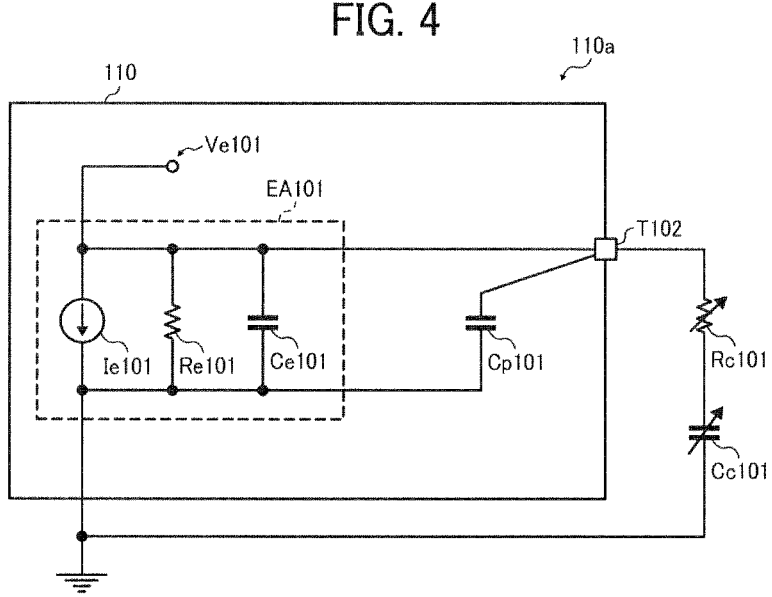
FIG. 4 is a circuit diagram illustrating a equivalent circuitry of the error amplification circuit shown in FIG. 1.

FIG. 4 is an equivalent circuit diagram illustrating an error amplification circuit 110a according to a comparative example. In the equivalent circuit shown in FIG. 4, an error amplifier EA101 is equivalent to the conventional error amplifier EA101 shown in FIG. 1. The error amplifier EA101 includes a current source Ie101 whose error-amplifier voltage-current conversion efficiency is gm101, an error amplifier output resistor Re101 whose resistance is re101, and an error amplifier output capacitor Ce101 whose capacitance is ce101. The current source Ie101, the error amplifier output resistor Re101, and the error amplifier output capacitor Ce101 are connected in parallel. A phase compensation resistor Rc101 and a phase compensation capacitor Cc101, which are provided outside an integrated circuit 110, are connected to a phase compensation terminal T102. Herein, since the phase compensation resistor Rc101 can be changed to resistors having various values of resistances and the phase compensation capacitor Cc101 can be changed to capacitors having various values of capacities, the phase compensation resistor Rc101 is represented as a variable resistor and the phase compensation capacitor Cc101 is represented as a variable capacitor shown in FIG. 4. A parasitic capacitor Cp101 generated at the phase compensation terminal T102 is connected to the error amplifier output capacitor Ce101 in parallel.

Synthetic impedance Ze101 composed by the error amplifier output resistor Re101, the error amplifier output capacitor Ce101, and the parasitic capacitor Cp101 is obtained by following formula 1. Herein, re101 represents resistance of the error amplifier output resistor Re101, ce101 represents capacitance of the error amplifier output capacitor Ce101, cp101 represents capacitance of the parasitic capacitor Cp101, j represents an imaginary unit, and ω represents an angular frequency.

$$Ze101 = \frac{1}{\frac{1}{re101} + j\omega(ce101 + cp101)} \quad (1)$$

Synthetic impedance Zc101 composed by the phase compensation resistor Rc101 and the phase compensation capacitor Cc101 is represented by following formula 2. Herein, rc101 represents resistance of the phase compensation resistor Rc101, cc101 represents capacitance of the phase compensation capacitor Cc101, j represents an imaginary unit, and ω represents an angular frequency.

$$Zc101 = rc101 + \frac{1}{j\omega cc101} \quad (2)$$

Accordingly, impedance Zeo101 at the error amplifier EA101 is represented by following formula 3 based on the formulas 1 and 2.

$$Zeo101 = \frac{1}{\frac{1}{Ze101} + \frac{1}{Zc101}} \quad (3)$$

Figure 5:
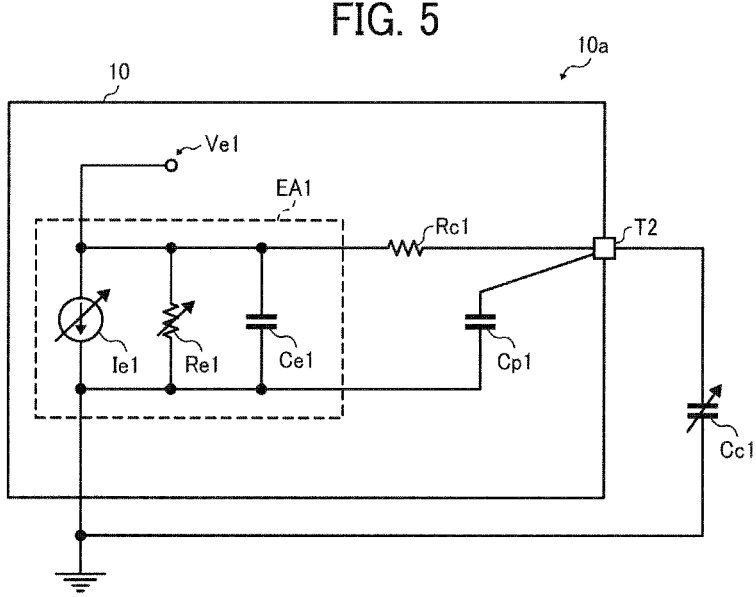
FIG. 5 is a circuit diagram illustrating a equivalent circuitry of the error amplification circuit shown in FIG. 2.

FIG. 5 is a circuit diagram illustrating an equivalent circuit to the error amplification circuit 10a shown in FIG. 3. In the equivalent circuit shown in FIG. 5, the error amplifier EA1 is equivalent to the error amplifier EA1 shown in FIG. 3, and the error amplifier EA1 includes a current source Ie1 whose error-amplifier voltage-current conversion efficiency is gm1, an error amplifier output resistor Re1 whose resistance is re1, and an error amplifier output capacitor Ce1 whose capacitance is ce1. The current source Ie1, the error amplifier output resistor Re1, and the error amplifier output capacitor Ce1 are connected in parallel. The phase compensation terminal T2 is connected to the phase compensation resistor Rc1 mounted in the integrated circuit 10 and is also connected to the phase compensation capacitor Cc1 provided outside the integrated circuit 10. In addition, the parasitic capacitor Cp1 generated at the phase compensation terminal T2 is connected in parallel to the phase compensation capacitor Cc1.

Herein, since the phase compensation capacitor Cc1 can be changed to capacitors having various values of the capacities, the phase compensation capacitor Cc1 is represented as a variable capacitor in FIG. 5. In addition, as described above, the integrated circuit 10 can control the bias current Ibias 1 externally.

In general, it is said that the error-amplifier voltage-current conversion efficiency gm1 of error amplifier EA1 is proportional to a square root of the bias current Ibias1, the resistance re1 of the error amplifier output resistor Re1 is inversely proportional to the bias current Ibias1. Accordingly, in the integrated circuit 10, since the error-amplifier voltage-current conversion efficiency gm1 and the resistance re1 can be controlled externally, the current source Ie1 is represented as a variable current source, and the error amplifier output resistor Re1 is represented as a variable resistor shown in FIG. 5.

Synthetic impedance Ze1 composed by the phase compensation resistor Re1 and the phase compensation capacitor Ce1 is represented by following formula 4. Herein, re1 represents resistance of the phase compensation resistor Re1, ce1 represents capacitance of the phase compensation capacitor Ce1, j represents an imaginary unit, and ω represents an angular frequency.

$$Ze1 = \frac{1}{\frac{1}{re1} + j\omega ce1} \quad (4)$$

Synthetic impedance Zc1 composed of the phase compensation resistor Rc1, the phase compensation capacitor Cc1, and the parasitic capacitor Cp1 is represented by following formula 5. Herein, rc1 represents resistance of the phase compensation resistor Rc1, cc1 represents capacitance of the phase compensation capacitor Cc1, cp1 represents capacitance of the parasitic capacitor Cp1, j represents an imaginary unit, and ω represents an angular frequency.

$$Zc1 = rc1 + \frac{1}{j\omega(cc1 + cp1)} \quad (5)$$

Accordingly, impedance Zeo1 at the error amplifier EA1 is represented by following formula 6 based on the formulas 4 and 5.

$$Zeo1 = \frac{1}{\frac{1}{Ze1} + \frac{1}{Zc1}} \quad (6)$$

As described above, frequency characteristic of the error amplifier EA101 according to the comparative example shown in FIG. 4 is determined by the impedance Zeo101 connected to the error amplifier EA101 and the error-amplifier voltage-current conversion efficiency gm101 of the current source Ie101.

By contrast, frequency characteristic of the error amplifier EA1 according to the present embodiment shown in FIG. 5 is determined by the impedance Zeo1 connected to the error amplifier EA1 and the error-amplifier voltage-current conversion efficiency gm1 of the current source Ie1.

Figure 6:
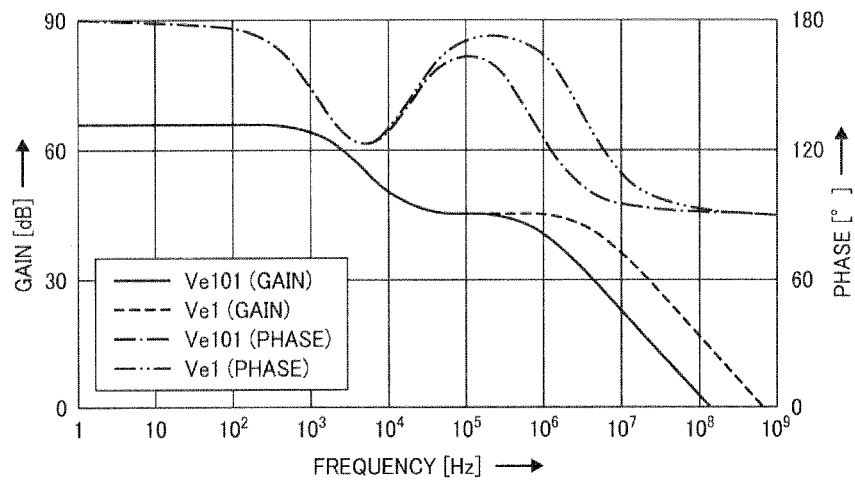
FIG. 6 is a graph illustrating frequency characteristics of the equivalent circuits of FIGS. 4 and 5.

FIG. 6 is a graph illustrating the frequency characteristics of the equivalent circuits of FIGS. 4 and 5. FIG. 6 shows frequency characteristics of gain and phase of the error voltage Ve101 output from the error amplifier EA101 and frequency characteristics of gain and phase of the error voltage Ve1 output from the error amplifier EA1. In the equivalent circuits shown in FIGS. 4 and 5, the error-amplifier voltage-current conversion efficiencies gm101 and gm1 are set to 1 mS, the resistances re101 and re1 of the phase compensation resistors Re101 and R102 are set to 1 MΩ, the capacitances ce101 and ce1 of the phase compensation capacitors Ce101 and Ce1 are set to 0.5 pF, the capacitances cp101 and cp1 of the parasitic capacitor Cp101 and Cp1 are set to 2 pF, the resistances rc101 and rc1 of the phase compensation resistors Rc101 and Rc1 are set to 100 kΩ, and the capacitances of the phase compensation capacitors Cc101 and Cc1 are set to 100 pF (gm101=gm1=1 mS, re101=re1=1 MΩ, ce101=ce1=0.5 pF, cp101=cp1=2 pF, rc101=rc1=100 kΩ, cc101=cc1=100 pF). When the error amplifiers EA101 and EA1 are constituted by identical elements, the high-frequency gain of the error amplifier EA1 is greater than that of the error amplifier EA101.

Figure 7:
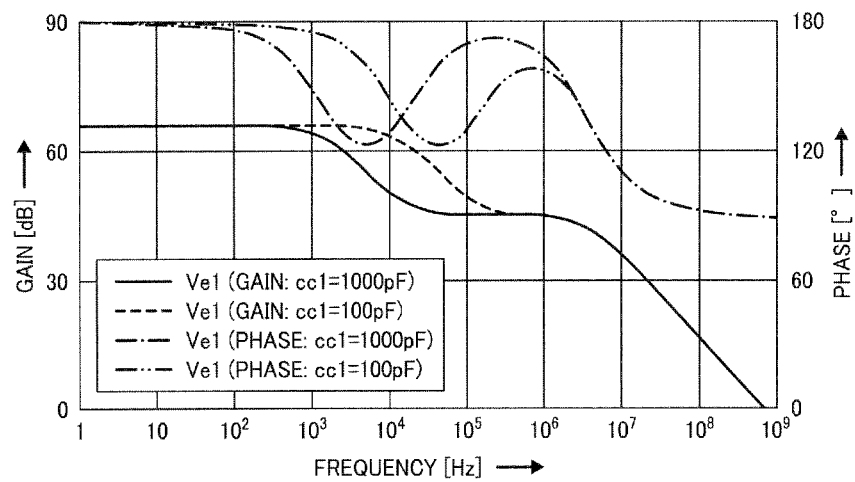
FIG. 7 is a graph illustrating the frequency characteristic of the equivalent circuit of FIG. 5 when a capacitance of a phase compensation capacitor is changed.

FIG. 7 is a graph illustrating the frequency characteristic of the equivalent circuit of FIG. 5. FIG. 7 shows frequency characteristics of gain and phase of the error voltage Ve1 output from the error amplifier EA1 when the capacitance cc1 of the phase compensation capacitor Cc1 is changed. In the equivalent circuit shown in FIG. 5, setting the error-amplifier voltage-current conversion efficiency gm1 to 1 mS, the resistance re1 of the phase compensation resistors Re1 to 1 MΩ, the capacitance ce1 of the phase compensation capacitors Ce1 to 0.5 pF, the capacitance cp1 of the parasitic capacitor Cp1 to 2 pF, and the resistance rc1 of the phase compensation resistor Rc1 to 100 kΩ (gm1=1 mS, re1=1 MΩ, ce1=0.5 pF, cp1=2 pF, rc1=100 kΩ), a condition in which the capacitance cc1 of the phase compensation capacitor Cc1 is 100 pF (cc1=100 pF) is compared with a condition in which the capacitance cc1 is 1000 pF (cc1=1000 pF). As illustrated in FIG. 6, even when the capacitance cc1 of the phase compensation capacitor Cc1 is changed, the high-frequency gain of the error amplifier EA1 is not changed. In addition, because the phase compensation resistor Rc is provided inside the integrated circuit 10, it cannot be replaced.

Figure 8:
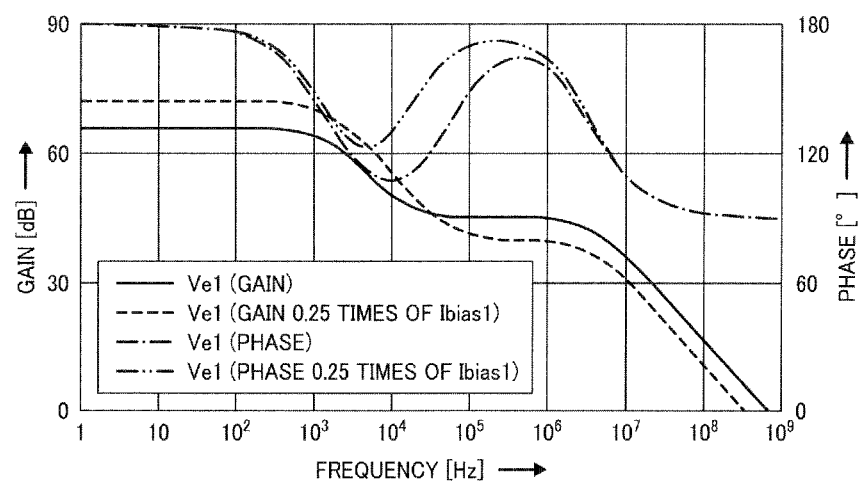
FIG. 8 is a graph illustrating the frequency characteristic of the equivalent circuit of FIG. 5 when a bias current is changed.

FIG. 8 is a graph illustrating the frequency characteristic of the equivalent circuit of FIG. 5. FIG. 8 shows frequency characteristics of gain and phase of the error voltage Ve1 output from the error amplifier EA1 when the bias current Ibias is changed. In the graph shown in FIG. 8, a first condition in which the error-amplifier voltage-current conversion efficiency gm1 is 1 mS, the resistance re1 of the phase compensation resistors Re1 is 1 MΩ, the capacitance ce1 of the phase compensation capacitors Ce1 is 0.5 pF, the capacitance cp1 of the parasitic capacitor Cp1 is 2 pF, the resistance rc1 of the phase compensation resistors Rc1 is 100 kΩ, and the capacitance cc1 of the phase compensation capacitor Cc1 is 100 pF (gm1=1 mS, re1=1 MΩ, ce1=0.5 pF, cp1=2 pF, rc101=rc1=100 kΩ, cc1=100 pF) in the equivalent circuit shown in FIG. 5, is compared with a second condition in which the error-amplifier voltage-current conversion efficiency gm1 is 0.5 mS, the resistance re1 is 4 MΩ, the capacitance ce1 is 0.5 pF, the capacitance cp1 of the parasitic capacitor Cp1 is 2 pF, the resistance rc1 of the phase compensation resistors Rc1 is 100 kΩ, and the capacitance cc1 of the phase compensation capacitor Cc1 is 100 pF (gm1=1 mS, re1=4 MΩ, ce1=0.5 pF, cp1=2 pF, rc101=rc1=100 kΩ, cc1=100 pF). The second condition assumes a case in which the first condition is controlled externally such that the bias current Ibias of the second condition is 0.25 times that of the first condition. Thus, although the phase compensation resistor Rc1 cannot be replaced because it is built into the integrated circuit 10, as illustrated in FIG. 8, the high-frequency gain of the error amplifier EA1 can be controlled by controlling the bias current Ibias externally.

As described above, in the present embodiment, by controlling the bias current Ibias of the error amplifier EA1 from outside the integrated circuit 10, the high-frequency gain of the error voltage Ve1 output from the error amplifier EA1 can be controlled. In addition, since the integrated circuit 10 includes the phase compensation resistor Rc1 to control the high-frequency gain of the error voltage Ve1 output from the error amplifier EA1 and includes the phase compensation terminal T2 that is connected to the phase compensation capacitor Cc1, the parasitic capacitor Cp1 of the phase compensation terminal T2 and the phase compensation capacitor Cc1 is connected in parallel to the phase compensation capacitor Cc1. Therefore, the phase compensation capacitor Cc1 can be mounted externally without increasing the size of the circuit and the consumption of current in the circuit compared to a configuration in which the error amplifier circuit has a built-in phase compensation circuit.

In addition, in the present embodiment, when the bias-current control terminal T1 is opened, the bias current Ibias1 whose value is the current value ir2 is supplied to the error amplifier EA1, which can reduce the number of external components of the integrated circuit 10 when the error amplification circuit 10a is activated using the bias current Ibias2 of the current value ir2.

Herein, FIG. 9 is a block diagram illustrating one example of the switching regulator 1 using above-described error amplifier 10a shown in FIG. 2. The switching regulator 1 shown in FIG. 9 includes the integrated circuit 10 that converts an input voltage Vin from an input terminal IN into a predetermined voltage and outputs the converted voltage as an output voltage Vout to an external load Z1 through an output terminal OUT.

The switching regulator 1 includes a switching element T1 constituted by a metal-oxide semiconductor (MOS) transistor for controlling a current output from the input terminal IN, and the switching element T1 is provided inside the integrated circuit 10. The switching regulator 1 includes an inductor L1 and an output capacitor Cout, provided outside the integrated circuit 10. It is to be noted, although the switching element T1 is provided inside the integrated circuit 10, the switching element T1 may be provided outside the integrated circuit 10. Similarly, although the inductor L1 and the output capacitor Cout are external components of the integrated circuit 10, the inductor L1 and the output capacitor Cout may be built in the IC 10.

The integrated circuit 10 includes an output feedback circuit 2, the reference voltage generation circuit 13, the amplification circuit 10a, an oscillation circuit 3, a slope voltage generation circuit 4, a pulse width modulation (PWM) comparison circuit 5, and a control circuit 6. As described above, in the error amplification circuit 10a, although the current generator circuit 11 and the phase compensation resistor 14 are provided inside the integrated circuit 10, the phase compensation capacitor 30 and the bias-current control circuit 20 are provided outside the integrated circuit 10. The bias-current control circuit 20 is connected to the current generator circuit 11 through the bias-current control terminal T1, and the phase compensation capacitor 30 is connected to the phase compensation resistor 14 through the phase compensation terminal T2.

Herein, operation in the switching regulator 1 is described. The output feedback circuit 2 feeds back the output voltage Vout for output to the error amplification circuit 10a as the feedback voltage Vfb1. The reference voltage generation circuit 13 generates a set reference voltage Vref1 for output to the error amplification circuit 10a. The error amplification circuit 10a receives the feedback voltage Vfb1 and the reference voltage Vref1 and amplifies a difference therebetween for output as an error voltage Ve1. The oscillation circuit 3 outputs a set pulse signal Vset, which adjusts on-timing of the switching element M1, to the control circuit 6. The oscillation circuit 3 also outputs the set pulse signal Vset, which adjusts start-timing in the slope voltage generation circuit 4, to the slope voltage generation circuit 4. The slope voltage generation circuit 4 generates a slope voltage Vs that starts temporal slope in accordance with the set pulse signal Vset for output to the PWM comparison circuit 5. The slope voltage Vs is input to a non-inverting input terminal of the PWM comparison circuit 5, and the error voltage Ve is input to an inverting input terminal thereof. The PWM comparison circuit 5 compares the slope voltage Vs and the error voltage Ve for output to the control circuit 6 as a comparison result Vpwm. The control circuit 6 turns on and off the switching element T1 in accordance with the set pulse signal Vset from the oscillation circuit 3 and the PWM comparison result Vpwm from the PWM comparison circuit 5.

Thus, in the present embodiment, without increasing the size of the circuit and increasing the consumption of current in the circuit dramatically compared to a switching regulator using an error amplifier circuit with a built-in phase compensation circuit, the phase compensation capacitor Cc1 can be mounted externally, which can cause the switching regulator 1 to be set high switching frequency and low current consumption.

Numerous additional modifications and variations are possible in light of the above teachings. It is therefore to be understood that, within the scope of the appended claims, the disclosure of this patent specification may be practiced otherwise than as specifically described herein.

What is claimed is:

1. An error amplification circuit comprising:
   an integrated circuit comprising:
   an error amplifier, having an output terminal, to amplify a difference between a predetermined reference voltage and an input feedback voltage for output;
   a current generator circuit to generate a bias current for supply to the error amplifier;
   a phase compensation resistor, connected to the output terminal of the error amplifier;
   a bias-current control terminal connected to the current generator circuit; and
   a phase compensation terminal connected to the output terminal of the error amplifier via the phase compensation resistor;
   a phase compensation capacitor connected to the phase compensation terminal, the phase compensation capacitor being provided outside the integrated circuit; and
   a bias-current control resistor electrically connectable to the bias-current control terminal,
   wherein the current generator circuit generates a first non-zero bias current when the bias-current control terminal is opened, and
   the current generator circuit generates a second bias current differing from the first bias current when the bias-current control terminal is connected to the bias-current control resistor.

2. The error amplification circuit according to claim 1, further comprising a bias-current control circuit electrically connectable to the bias-current control terminal,
   wherein the current generator circuit generates a first non-zero bias current when the bias-current control terminal is opened, and
   the current generator circuit generates a third bias current differing from the first bias current when a bias-current control voltage generated in the bias-current control circuit is applied to the bias-current control terminal.

3. A switching regulator comprising an integrated circuit comprising:
   a reference voltage generation circuit to generate a predetermined reference voltage;
   a feedback circuit to feedback a voltage for output as a feedback voltage;
   the error amplification circuit of claim 1 to amplify a difference between the predetermined reference voltage and the feedback voltage for output.

4. A control method for controlling an error amplification circuit that includes an integrated circuit and a phase compensation capacitor,
   the control method comprising:
   generating a bias current in a current generator circuit in the integrated circuit;
   controlling the bias current from outside the integrated circuit;
   generating a predetermined reference voltage in the integrated circuit;
   inputting a feedback voltage, the predetermined reference voltage, and the bias current to an error amplifier in the integrated circuit;
   amplifying a difference between the predetermined reference voltage and the feedback voltage for output as an error voltage in the error amplifier in the integrated circuit;
   applying the error voltage to a phase compensation resistor; and
   compensating for phase in the error amplifier in the integrated circuit by the phase compensation resistor in the integrated circuit and the phase compensation capacitor provided outside the integrated circuit,
   wherein the bias current is generated in accordance with resistance of a bias-current control resistor provided outside the integrated circuit, and the bias-current control resistor is electrically connectable to the current generator circuit in the integrated circuit.

5. The control method according to claim 4, further comprising the steps of:
   generating with the current generator circuit a first non-zero bias current when a bias-current control terminal connected to the current generator circuit and electrically connectable to the bias-current control circuit is opened; and
   generating with the current generator circuit a second bias current differing from the first bias current when the bias-current control terminal is connected to the bias-current control resistor.

6. A control method for controlling an error amplification circuit that includes an integrated circuit and a phase compensation capacitor,
   the control method comprising:
   generating a bias current in a current generator circuit in the integrated circuit;
   controlling the bias current from outside the integrated circuit;
   generating a predetermined reference voltage in the integrated circuit;
   inputting a feedback voltage, the predetermined reference voltage, and the bias current to an error amplifier in the integrated circuit;
   amplifying a difference between the predetermined reference voltage and the feedback voltage for output as an error voltage in the error amplifier in the integrated circuit;
   applying the error voltage to a phase compensation resistor; and
   compensating for phase in the error amplifier in the integrated circuit by the phase compensation resistor in the integrated circuit and the phase compensation capacitor provided outside the integrated circuit,
   wherein the generating of the bias current is controlled by a bias-current control voltage generated in a bias-current control circuit provided outside the integrated circuit and electrically connectable to the current generator circuit in the integrated circuit.

7. The control method according to claim 6, further comprising the steps of:
   generating a first non-zero bias current with the current generator circuit when a bias-current control terminal connected to the current generator circuit and electrically connectable to the bias-current control circuit is opened; and
   generating a third bias current differing from the first bias current with the current generator circuit when the bias-current control voltage is applied to the bias-current control terminal.

* * * * *